June 24, 1958  J. F. CAMPBELL  2,840,107
VARIABLE AREA SCHEDULING VALVE
Filed Jan. 31, 1955
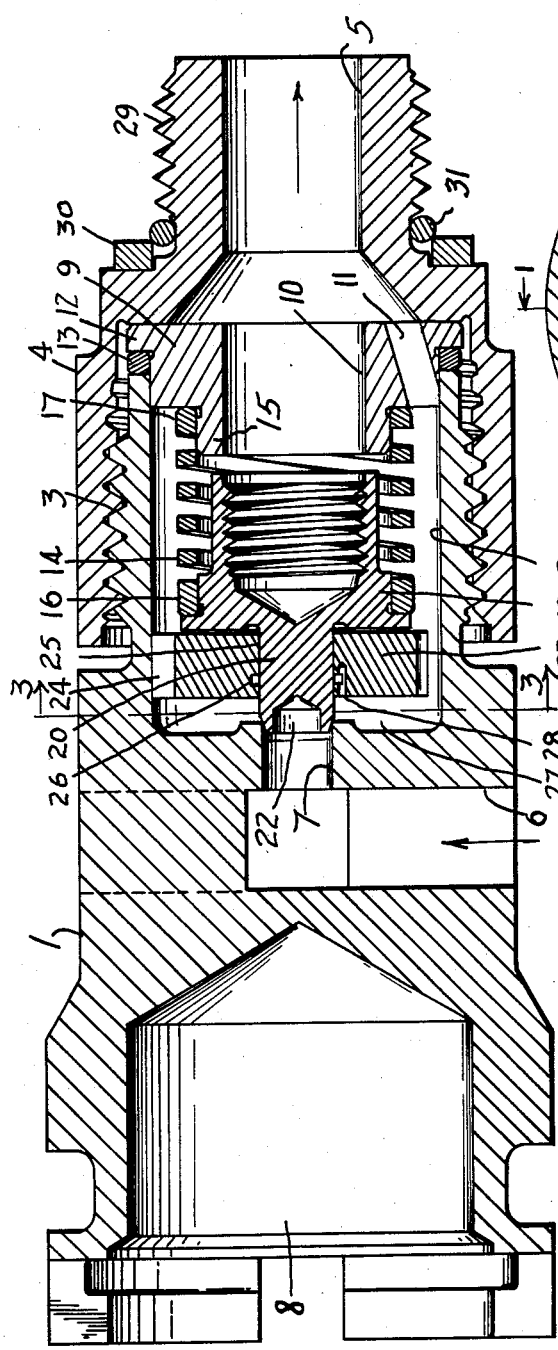
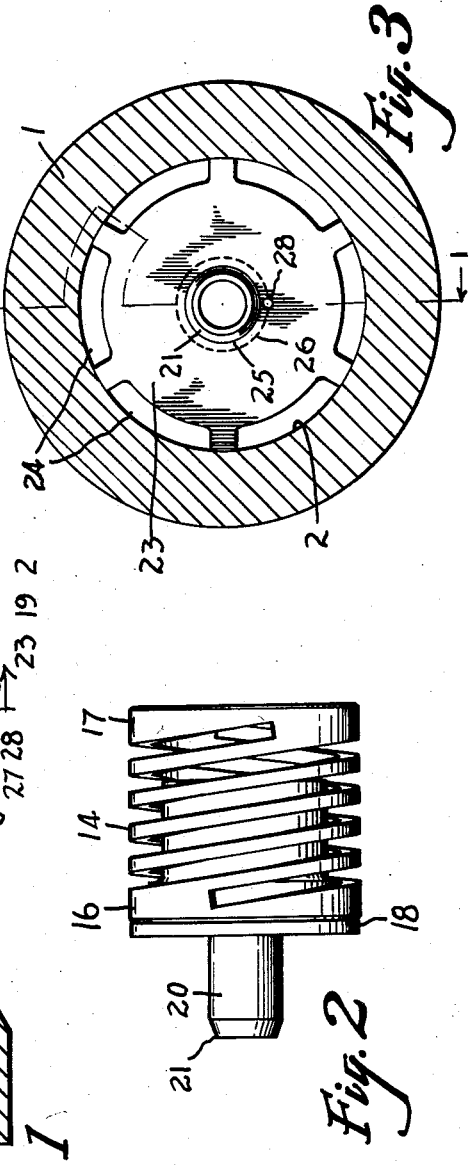
INVENTOR.
JOHN F. CAMPBELL
BY Oberlin & Limbach
ATTORNEYS

2,840,107

VARIABLE AREA SCHEDULING VALVE

John F. Campbell, Euclid, Ohio

Application January 31, 1955, Serial No. 484,989

3 Claims. (Cl. 137—540)

This invention relates as indicated to a variable area scheduling valve, and more particularly to a valve of this type having unusually uniform and reliable performance characteristics.

Variable area scheduling and metering valves are employed for many purposes where it is desired that fluid flow be initiated upon the attaining of a certain minimum pressure with such flow increasing at a desired rate as the pressure increases. Various forms of metering valves are known, an important type utilizing a spring-backed axially reciprocable valve member normally engaging in the valve opening or passage and with either or both such member and passage contoured to afford selected rates of flow at various stages in the opening movement of the valve member. Valves of this general type have tended to be rather expensive of manufacture and not too uniform and reliable in their action due to frictional engagement of moving parts and unequal action of the spring biasing the valve member.

It is accordingly a principal object of my invention to provide a variable area metering valve which will be effective to maintain a very accurate alignment of the metering valve member or needle relative to its seat.

A further object is to provide such valve capable of large-scale production with a high degree of uniformity so that performance may be obtained closely consistent within a few percent of a master program of flow rate versus operating pressure.

Another object is to provide such valve in which the needle valve member is mechanically centered, hydraulically centered and supported against the application of hydraulic force thereon in a manner stabilizing the action of the same.

Yet another object is to provide such valve including means effective to eliminate chatter and excessive vibration due to pulsations in the liquid flow.

Fuel utilized in present-day gas turbine and ram-jet propulsions units is conveyed in a manifold which usually encircles the combustion section. Branch conduits are employed to transfer fuel from the supply manifold to a multitude of combustion chambers or combustion zones in one chamber. It is essential to maintain uniformity of flow rate between the branch conduits to achieve combustion temperatures which are uniform within safe operating limits. An increase of flow rate in one branch greater than approximately 10% of the average in all the branches will result in a combustion temperature sufficiently high severely to damage the elements of the combustion zone associated with that branch. A maximum fuel flow deviation of 4% is normally all that is tolerated.

Other objects of the invention will appear as the description proceeds.

To the accomplishment of the foregoing and related ends, said invention then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

Fig. 1 is a longitudinal sectional view through a variable area scheduling valve embodying the principles of my invention;

Fig. 2 is a side view of the valve needle and associated compression spring; and Fig. 3 is a transverse section taken on the line 3—3 on Fig. 1.

The valve of this invention resembles in certain respects that disclosed in my co-pending application Serial No. 408,935 filed February 8, 1954, and constitutes a further improvement thereof.

Referring now more particularly to the drawing, the embodiment of my invention there illustrated comprises a main body member 1 having an axial extension with a cylindrical bore 2 adapted to contain the moving parts of my valve. The outer surface of such extension is threaded at 3 to receive and engage cylindrical valve end member 4 including axial outlet port 5. A lateral inlet port 6 may be provided in valve body 1 communicating with axial cylindrical passage or bore 7 leading to the main valve cavity 2. Alternatively, an axial inlet port may be provided from end cavity 8 in the valve mounting base portion of body member 1.

A spring seat member 9 having a central cylindrical bore 10 has a plurality of smaller passages 11 arranged circumferentially thereof to place cavity 2 and outlet port 5 in communication. The outer peripheral surface of seat 9 is carefully ground precisely to fit the bore of chamber 2 with the spring seating portions precisely axially aligned with cylindrical inlet port 7. The two faces of flange 12 of seat 9 are likewise carefully ground and an adjusting shim 13 may be interposed between such flange and the end of threaded extension of valve body member 1 to regulate the degree of normal compression of spring 14 as explained below.

One end of spring 14 is seated on member 9 and precisely axially centered by cylindrical pilot extension 15 of such seat, both such extension and the spring being carefully ground to ensure such precise alignment. Spring 14 is a unitary multi-coil spring, the two ends 16 and 17 of which define complete cylindrical rings and are themselves integral with the two coils of the spring (which are joined to such unitary end portions at diametrically opposite points). There is no tendency of this spring to cant as it is compressed or extended.

The valve needle member includes a flange portion 18 engaging the other end of spring 14 and a cylindrical portion 19 received within the spring including a carefully ground cylindrical portion fitting snugly within end 16 of the spring. The needle proper comprises an axial cylindrical extension 20 having a beveled end portion 21 adapted to seat against the inner edge of inlet port passage 7. Shim 13 will be selected to ensure that spring 14 is normally compressed to the extent necessary to ensure the seating of needle 20 in the inlet port with the desired pressure, which pressure must of course be overcome by the entering flow of liquid before the valve will open in use. The extreme end of needle 20 may be drilled at 22 somewhat to improve the characteristics of fluid flow through the valve although such blind hole in the end of the valve member is not essential.

A baffle 23 is press-fitted within bore 2 and provided with a plurality of grooves such as 24 providing passages for fluid flow from inlet 7 to the principal cavity within bore 2 when the valve is open. Needle 20 extends through axial bore 25 in baffle 23, such bore being provided with an annular groove 26 communicating with the small cavity 27 defined within bore 2 by baffle 23 by means of a small drilled passage 28. The provision of such passage 28 and groove 26 admits fluid to the sliding fit of needle 20 in bore 25 and tends to reduce the likelihood of grit being forced into such bore by the flow of fluid through inlet passage 7.

While needle 20 and bore 25 are each carefully ground to true cylindrical contour, they do not make a tight fit and there will be several thousandths of an inch clearance therebetween sufficient for the formation of a film of fluid between the baffle and the needle, such clearance moreover being sufficient to pass minute particles of grit of five microns or less in diameter.

The exit end portion of valve body member 4 is threaded at 29 to receive an appropriate fitting or coupling and may be provided with a copper sealing washer 30 held in place by snap ring 31.

The needle valve member, spring element and pilot member or seat are very closely and accurately fitted together and it is ordinarily desirable ot press-fit the same, but preloading of the spring and hydraulic pressure in use may, if desired, be relied upon to hold such parts together. The inner end of the needle valve member may be drilled and tapped as shown to lighten the same and to facilitate mounting on an appropriate support during manufacture. The entire assembled valve as shown in Fig. 1 may be less than 2 inches in length, for example. Valve needle 20 may have various contours to achieve corresponding rate of flow programs, but may ordinarily have a rather high degree of taper (on the order of 15° to the axis, for example) concentric with the axis of the spring and of inlet passage 7. Baffle 23, on the other hand, will preferably be press-fitted in place and positioned in bore 2 so that the shoulder or flange 18 of the needle member does not quite contact the same even when the valve is in fully closed position. Baffle 23, of course, diverts the fluid flow generally radially outwardly for passage through grooves 24, and reciprocation of the needle accordingly results substantially entirely from fluid pressure against the end of needle 20 including the beveled or tapered portion 21. The hydraulic forces are symmetrical relative to the needle and are also exerted well within the perimeter of the spring end since the diameter of passage 7 is preferably substantially less than the outer diameter of the spring. Of course, the inner diameters of bore 2 and bore 25 are concentric, with zero run-out between the end face of seat member 9 and the shoulder of valve body member 4 engaging the same. The fact that the ends of the spring member are integral and solid permits reliance thereon in maintaining precise alignment of the needle, an impossibility when ordinary compression springs are employed, the ends of which tend to expand as the spring is compressed. As a result, it is possible to produce a large number of valves in accordance with my invention on a regular production schedule, varying only within a few percent of a master program of flow rate versus operating pressure. The particular liquid flow versus operating pressure program of the valve will preferably be determined by appropriate selection of spring rate, metering needle contour, and the contour of the opposed seat for such needle in inlet passage 7.

The provision of baffle 23 with its central bore 25 serves to prevent appreciable lateral oscillation of the needle when the valve is open and violent pulsations occur in the fluid flow delivered to the valve. Such baffle also tends to reduce vibration and chatter sometimes occurring in the past when rapid pulsations were transmitted through the fluid flow to the valve having the natural resonant frequency of the spring. As a consequence, my new variable area scheduling valve is particularly suited for employment in the fuel systems of jet engines and the like.

The spring element of Figs. 1 and 2 is shown as comprising two interleaved coils joining with the integral solid end portions at diametrically opposite points. A larger number of similarly interleaved coils may also be employed with their ends terminating at uniformly circumferentially located points in such solid ends. Compression of such springs results in a uniform axial force on the ends thereof without any tendency toward canting. Furthermore, the integral ends 16 and 17 are not subject to radially outward expansion under the action of compressive forces as is the case with the usual coil spring. The coil portions of my spring may conveniently be formed by a milling operation so that the turns are of generally rectangular cross-section.

Other modes of applying the principle of the invention may be employed, change being made as regards the details described, provided the features stated in any of the following claims or the equivalent of such be employed.

I therefore particularly point out and distinctly claim as my invention:

1. A variable area metering valve comprising two cylindrical body members axially threadedly joined together to provide a chamber having a cylindrical bore, an axial inlet passage to such chamber in one said member of substantially less diameter than such bore of such chamber, an axial outlet passage in the other said member, a spring seat member having a peripheral flange secured between the inner threaded end of one said body member and a shoulder in said other body member adjacent such outlet passage, symmetrically disposed passages through said seat member placing such chamber and outlet passage in communication, an axial pilot boss on said seat member, a valve needle member in such chamber having a body portion and a somewhat more narrow needle portion adapted to engage and close the exit end of said inlet passage to such chamber and an axial boss extending toward said boss on said seat member, a unitary compression spring member interposed between said needle member and said seat member having integral cylindrical end portions closely fitting said respective bosses, said spring member comprising a plurality of spring coils joined to said end portions at uniformly circumferentially spaced points to ensure compression and extension without tendency to cant, said needle portion including an axial cylindrical portion, and a baffle member press-fitted within such bore of such chamber provided with a central bore through which said cylindrical portion of said needle portion extends with sufficient clearance to admit a thin film of liquid therebetween, said baffle member having passages therethrough to admit fluid flow from said inlet passage to such chamber on the other side of said baffle, said spring being compressed normally to hold said needle in engagement with said inlet passage with the body of said needle member spaced from said baffle.

2. The valve of claim 1 wherein the end of said needle portion adapted to engage the end of said inlet passage is beveled.

3. A variable area metering valve comprising two cylindrical body members axially threadedely joined together to provide a chamber having a cylindrical bore, an axial inlet passage to such chamber in one said member of substantially less diameter than such bore of such chamber, an axial outlet passage in the other said member, a spring seat member having a peripheral flange secured between the inner threaded end of one said body member and a shoulder in said other body member adjacent such outlet passage, symmetrically disposed passages through said seat member placing such chamber and outlet passage in communication, an axial pilot boss on said seat member, a valve needle member in such chamber having a body portion and a somewhat more narrow needle portion adapted to engage and close the exit end of said inlet passage to such chamber and an axial boss extending toward said boss on said seat member, a unitary compression spring member interposed between said needle member and said seat member having integral cylindrical end portions closely fitting said respective bosses, said spring member comprising a plurality of spring coils joined to said end portions at uniformly circumferentially spaced points to ensure compression and extension without tendency to cant, said needle portion including an axial cylindrical portion, a baffle member press-fitted within such bore of such chamber provided with a central bore through which said cylindrical portion of said needle portion extends with sufficient clearance to admit a thin film of liquid therebetween, said baffle member having passages therethrough to admit fluid flow from said inlet passage to such chamber on the other side of said baffle, said spring being compressed normally to hold said needle in engagement with said inlet passage with the body of said needle member spaced from said baffle, the end of said needle portion adapted to engage the end of said inlet passage being beveled, an annular groove in the surface of such central bore in said baffle member, and a small passage leading from the upstream side of said baffle to said groove.

References Cited in the file of this patent

UNITED STATES PATENTS

| | | |
|---|---|---|
| 1,804,897 | Thomas | May 12, 1931 |
| 2,343,079 | Pickwell | Feb. 29, 1944 |
| 2,361,881 | Sheppard | Oct. 31, 1944 |
| 2,568,026 | Pigott | Sept. 18, 1951 |
| 2,695,032 | Kmiecik | Nov. 23, 1954 |
| 2,704,549 | Strnad | Mar. 22, 1955 |

FOREIGN PATENTS

| | | |
|---|---|---|
| 4,175 | Great Britain | Dec. 19, 1873 |